United States Patent
Lewis, Sr.

(10) Patent No.: US 9,641,045 B2
(45) Date of Patent: May 2, 2017

(54) ELECTROMAGNETIC PLATFORM MOTOR (EPM) (EPM-1) (EPM-2)

(71) Applicant: Bill Lewis, Sr., Oakland, CA (US)

(72) Inventor: Bill Lewis, Sr., Oakland, CA (US)

(*) Notice: Subject to any disclaimer, the term of this patent is extended or adjusted under 35 U.S.C. 154(b) by 0 days.

(21) Appl. No.: 14/121,645

(22) Filed: Oct. 2, 2014

(65) Prior Publication Data
US 2016/0099630 A1  Apr. 7, 2016

(51) Int. Cl.
| | | |
|---|---|---|
| *B60L 11/12* | (2006.01) | |
| *H02P 9/04* | (2006.01) | |
| *H02K 7/06* | (2006.01) | |
| *H02K 11/00* | (2016.01) | |
| *F03B 11/00* | (2006.01) | |
| *H02P 9/02* | (2006.01) | |
| *H02K 33/16* | (2006.01) | |
| *F02B 63/04* | (2006.01) | |
| *F03G 7/08* | (2006.01) | |
| *H02K 7/18* | (2006.01) | |
| *H02K 7/116* | (2006.01) | |
| *H02K 53/00* | (2006.01) | |

(52) U.S. Cl.
CPC .......... *H02K 7/06* (2013.01); *F03B 11/00* (2013.01); *H02K 11/001* (2013.01); *H02K 33/16* (2013.01); *H02P 9/02* (2013.01); *H02K 7/116* (2013.01); *H02K 53/00* (2013.01)

(58) Field of Classification Search
None
See application file for complete search history.

(56) References Cited

U.S. PATENT DOCUMENTS

| 634,667 | A | * | 10/1899 | Hopper | H02K 7/065 |
| | | | | | 310/24 |
| 3,696,251 | A | * | 10/1972 | Last | F03B 13/1855 |
| | | | | | 290/53 |
| 4,239,975 | A | * | 12/1980 | Chiappetti | F03G 7/08 |
| | | | | | 290/1 R |
| 4,359,673 | A | * | 11/1982 | Bross, Jr. | H02K 33/00 |
| | | | | | 310/24 |

(Continued)

OTHER PUBLICATIONS

T&M Atlantic—Power Supplies; 2010-2017; http://www.tmatlantic.com/e-store/index.php?SECTION_ID=355&arrFilter_235_MIN=&arrFilter_235_MAX=&arrFilter_238_MIN=&arrFilter_238_MAX=&arrFilter_P3_MIN=&arrFilter_P3_MAX=&set_filter=Show&SHOWALL_1=1.*

(Continued)

*Primary Examiner* — Pedro J Cuevas

(57) ABSTRACT

The present invention is a new 21$^{st}$ Century Electric Generation. It is an electromagnetic actuated generator mechanism that use magnetic field like a wrecking yard uses extremely powerful electromagnet device to move heavy piece of metal from one place to another. The electromagnetic actuated generator is supported by a platform with a track and wheel system, whereby the mechanism is control by the magnetic field of a wound coil of magnet wire, wherein current is supply by a DC variable power supply or a plurality of battery packs. The mechanism is connected to a plurality of levers with mechanical advantage connection to a ratchet system transforming reciprocating mechanical power to rotation mechanical power connected to a gear transmission system connected to an electrical generator for transforming the mechanical power to electrical energy.

9 Claims, 11 Drawing Sheets

(56) References Cited

U.S. PATENT DOCUMENTS

| | | | | |
|---|---|---|---|---|
| 4,418,542 A * | 12/1983 | Ferrell | F04B 9/00 | 417/229 |
| 4,507,579 A * | 3/1985 | Turner | H02K 7/065 | 310/15 |
| 4,532,431 A * | 7/1985 | Iliev | F02B 63/04 | 123/46 E |
| 4,980,572 A * | 12/1990 | Sen | F03G 7/08 | 290/1 R |
| 5,157,922 A * | 10/1992 | Baruch | F03G 3/00 | 417/229 |
| 5,355,674 A * | 10/1994 | Rosenberg | F03G 3/00 | 290/1 R |
| 5,457,349 A * | 10/1995 | Gifford | H02K 7/065 | 310/24 |
| 5,570,286 A * | 10/1996 | Margolis | B60G 13/14 | 180/165 |
| 5,634,774 A * | 6/1997 | Angel | F03G 7/08 | 417/229 |
| 6,002,184 A * | 12/1999 | Delson | H02K 23/00 | 273/148 R |
| 6,091,159 A * | 7/2000 | Galich | F03G 7/08 | 290/1 R |
| 6,147,422 A * | 11/2000 | Delson | H02K 23/00 | 273/148 R |
| 6,172,426 B1 * | 1/2001 | Galich | F03G 7/08 | 290/1 R |
| 6,204,568 B1 * | 3/2001 | Runner | F03G 7/08 | 290/1 R |
| 6,307,285 B1 * | 10/2001 | Delson | H02K 23/00 | 273/148 R |
| 6,376,925 B1 * | 4/2002 | Galich | F03G 7/08 | 290/1 R |
| 6,705,085 B1 * | 3/2004 | Braithwaite | E21B 41/0085 | 290/1 R |
| 6,767,161 B1 * | 7/2004 | Calvo | F03G 7/08 | 290/1 R |
| 6,858,952 B2 * | 2/2005 | Gott | F03G 7/08 | 290/1 R |
| 6,949,840 B2 * | 9/2005 | Ricketts | F03G 7/08 | 290/1 A |
| 6,969,213 B2 * | 11/2005 | Rastegar | E01C 9/007 | 404/11 |
| 7,043,904 B2 * | 5/2006 | Newman | F03G 7/10 | 290/43 |
| 7,067,932 B1 * | 6/2006 | Ghassemi | H02K 7/1853 | 290/1 R |
| 7,145,257 B2 * | 12/2006 | Ricketts | F03G 7/08 | 290/1 R |
| 7,239,031 B2 * | 7/2007 | Ricketts | F03G 7/08 | 290/1 A |
| 7,432,607 B2 * | 10/2008 | Kim | F03G 7/08 | 290/1 R |
| 7,530,760 B2 * | 5/2009 | Rastegar | E01C 9/007 | 290/1 R |
| 7,530,761 B2 * | 5/2009 | Kenney | F01D 17/26 | 404/17 |
| 7,541,684 B1 * | 6/2009 | Valentino | B60L 7/16 | 290/1 R |
| 7,605,482 B2 * | 10/2009 | Brown | F03G 7/08 | 290/1 R |
| 7,626,279 B2 * | 12/2009 | Brown | F03G 7/08 | 290/1 R |
| 7,629,700 B2 * | 12/2009 | Begley | H02K 35/02 | 290/1 R |
| 7,795,746 B2 * | 9/2010 | Riley | H02K 7/1853 | 290/1 R |
| 7,984,684 B2 * | 7/2011 | Hinderks | B63B 1/28 | 114/274 |
| 8,217,523 B2 * | 7/2012 | Brown | F03G 5/06 | 290/1 R |
| 8,283,794 B2 * | 10/2012 | Brezet | F03G 7/08 | 290/1 R |
| 8,344,560 B2 * | 1/2013 | Gosvener | H02K 7/075 | 310/14 |
| 8,461,700 B2 * | 6/2013 | Kennedy | F03G 7/08 | 290/1 R |
| 8,461,701 B2 * | 6/2013 | Kennedy | F03G 7/08 | 290/1 R |
| 8,466,570 B2 * | 6/2013 | Kennedy | F03G 7/08 | 290/1 R |
| 8,466,571 B2 * | 6/2013 | Kennedy | F03G 7/08 | 290/1 R |
| 8,471,395 B2 * | 6/2013 | Kennedy | F03G 7/08 | 290/1 R |
| 8,680,697 B2 * | 3/2014 | Alqanee | H02K 51/00 | 290/1 C |
| 9,212,654 B2 * | 12/2015 | Kennedy | F03G 7/08 | |
| 9,341,167 B2 * | 5/2016 | Kennedy | F03G 7/08 | |
| 9,366,234 B2 * | 6/2016 | Sanchez | F03D 9/10 | |
| 9,366,239 B2 * | 6/2016 | Kennedy | F03G 7/08 | |
| 9,394,876 B2 * | 7/2016 | Zuo | F03B 13/18 | |
| 9,410,537 B2 * | 8/2016 | Kennedy | F03G 7/08 | |
| 9,470,214 B2 * | 10/2016 | Kennedy | F03G 7/08 | |
| 2008/0141921 A1 * | 6/2008 | Hinderks | B63B 1/28 | 114/274 |
| 2010/0032946 A1 * | 2/2010 | Begley | H02K 35/02 | 290/3 |
| 2012/0139262 A1 * | 6/2012 | Begley | H02K 35/02 | 290/1 R |
| 2012/0227389 A1 * | 9/2012 | Hinderks | F01B 1/10 | 60/317 |
| 2015/0260095 A1 * | 9/2015 | Hinderks | B63B 1/28 | 123/568.11 |

OTHER PUBLICATIONS

TDK-Lambda—High Current Programable AC to DC Power Supplies, Outputs from 6V to 1500V, with current up to 1,000A;1999-2017; http://www.us.tdk-lambda.com/hp/product_html/low_volt.htm.*

TDK-Lambda—High Voltage Capacitor Charging and DC Power Supplies, Outputs from 1 kV to 50kV, 500J/sec to 30kJ/sec; 1999-2017; http://www.us.tdk-lambda.com/hp/product_html/high_volt.htm.*

Lever illustration; http://hendrix2.uoregon.edu/~dlivelyb/phys101/images/L8-14.gif.*

* cited by examiner

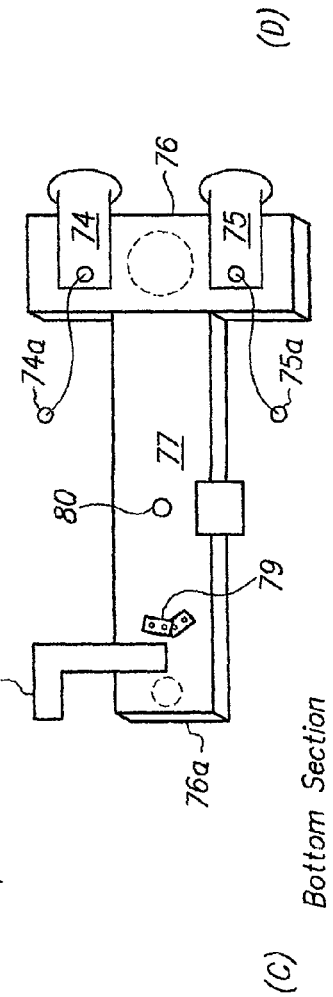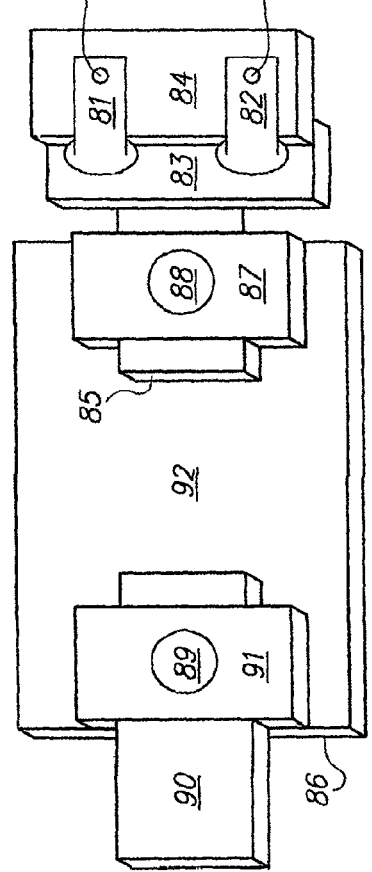
FIG. 6
FIG. 6A

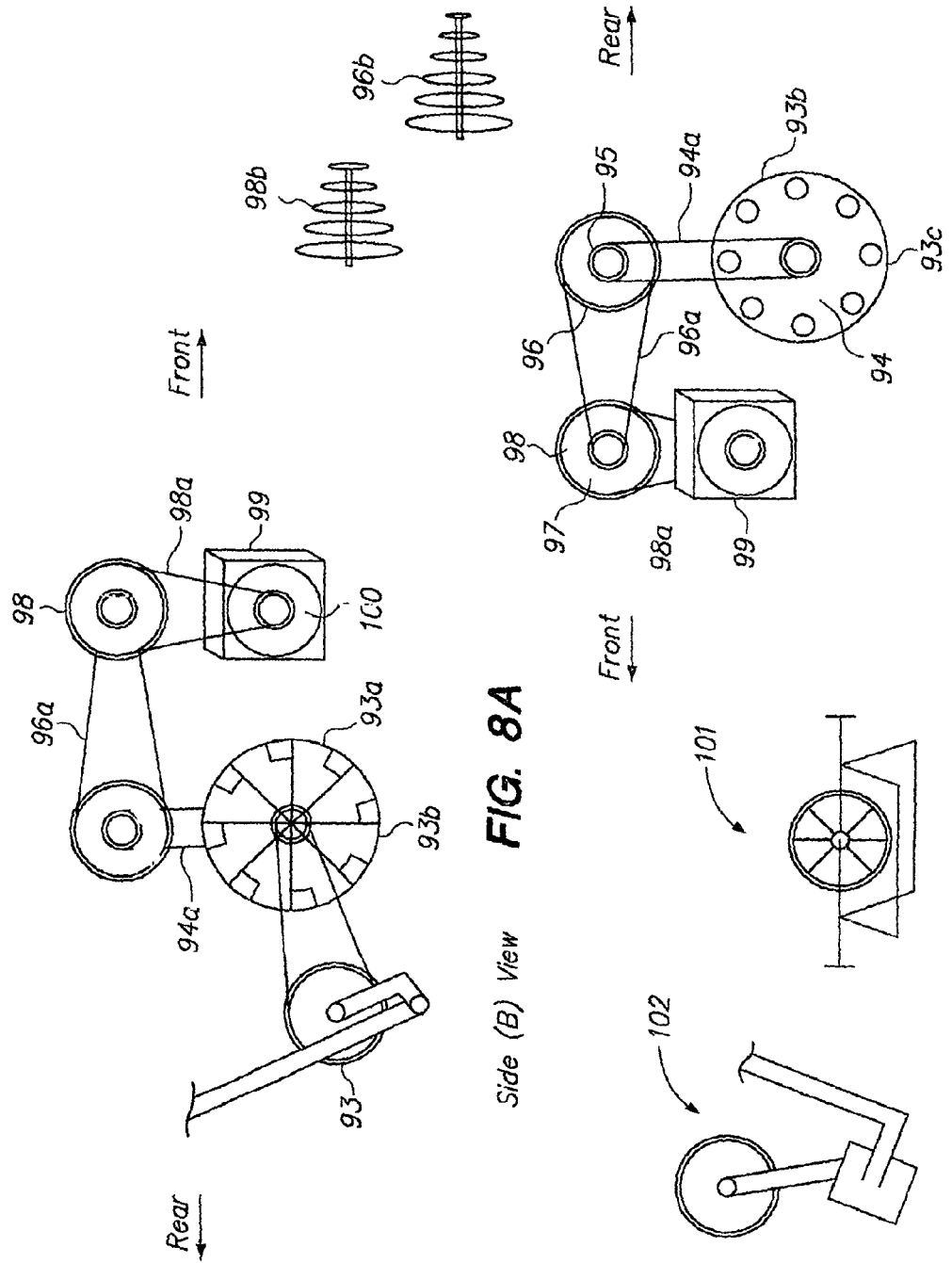

US 9,641,045 B2

ELECTROMAGNETIC PLATFORM MOTOR (EPM) (EPM-1) (EPM-2)

FIELD OF THE INVENTION

The field of this invention is a reciprocating machine with the additional employment of an electromagnetic platform motor on track wheels connected to a mechanism having multiple levers, a ratcheting system, and a gear system that rotates the shaft of an electric generator, producing electricity.

BACKGROUND OF THE INVENTION

An idyllic source for generating rotational motion or mechanical energy to generate electrical energy remains an elusive goal. HEP (Hydro-Electric Power) requires the construction of massive structures in waterways and rivers to provide the requisite fluid energy to be transformed into rotational motion by a turbine to drive a generator, thus disrupting marine life and precious water resources for those relying on such waterways and rivers.

Nuclear power can generate enormous electrical energy and can serve vast population segments. However, the impact of a nuclear meltdown on the environment and nearby residents can be catastrophic. Coal energy can fill some void, but is highly polluting of the environment.

Gasoline motors are commonly used as the prime mover of an electric generator in a hybrid automobile. Electric automobiles use a bank of batteries to power the electric motors and the bank of batteries has to be re-charge for continue operation.

The present invention has none of the prior art disadvantages and is a system that uses an electromagnetic force field to produce linear motion to a system of hinged levers connected to a ratcheting system that can provide rotational motion that can be harnessed for producing electricity.

A wrecking yard uses an extremely powerful electromagnet device that creates a powerful electric field through the application of electricity to a coil for moving heavy pieces of metal from one place to another. A magnet has two poles: "north and south". The north end of one magnet will attract the south end of another magnet. The north ends of two magnets will repel each other (and similarly, the south end of one magnet will repel the south end of another magnet).

The electromagnetic field in a coil circuit can be increased thousands of times by increasing the number of turns of the enameled magnetic copper wire (coil), where the voltage source remains the same.

SUMMARY OF INVENTION

The presence invention, ELECTROMAGNETIC PLATFORM MOTOR (EPM) comprises an electromagnetic platform motor on track wheels that reciprocates linearly, said platform motor connected to a mechanical arrangement of hinged levers further connected to a ratcheting system that transforms linear reciprocating motion into rotational motion to produce a torque force to rotate the input gear/shaft connection of an electric generator to produce electricity.

The EPM comprises a linear motor with at least two separate groups of super strong permanent magnets attached on opposite sides of the platform of the motor frame. A powerful electromagnet comprising an aluminum tube and a coil is positioned and secured inside the area of the motor frame where the super strong permanent magnets move, inward or outward of the electromagnet when a DC voltage is connected to the electrical coil. The reversible electrical system connections reverse current flow to the electromagnetic aluminum tube, thereby reversing the magnetic field that attracts/repels and repels/attracts the groups of super strong permanent magnets attached to the platform motor frame, producing inward and outward movements of the frame. The lever sections are connected to a ratcheting system having a wheel. The wheel is connected to a series of gear connections to transform speed and torque force to rotate the input gear/shaft of an electric generator.

A D.C. Variable Power Supply is the power source to the electromagnetic motor.

The D.C. Variable Power Supply can be replaced with two separate groups of series connected motor vehicle batteries, each connected into a parallel circuit with the electrical system.

BRIEF DESCRIPTION OF THE DRAWINGS

FIG. 5A shows a side view of the ELECTRICAL SWITCH.

FIG. 6 shows the ELECTRICAL SWITCH SECTIONS—TOP & BOTTOM.

FIG. 6A shows a side view of the ELECTRICAL SWITCH.

FIG. 8 & FIG. 8A shows view from Side (B) a modified ten speed bicycle with weights secured & evenly spaced around the wheel, the flywheels (gears), cassettes (gears), bicycle chains, the modified bicycle paddle, a bike stand and a modified electric generator.

FIG. 8B shows view from Side (A).

DETAILED DESCRIPTION OF THE PREFERRED EMBODIMENT (EPM)

Figure 1:
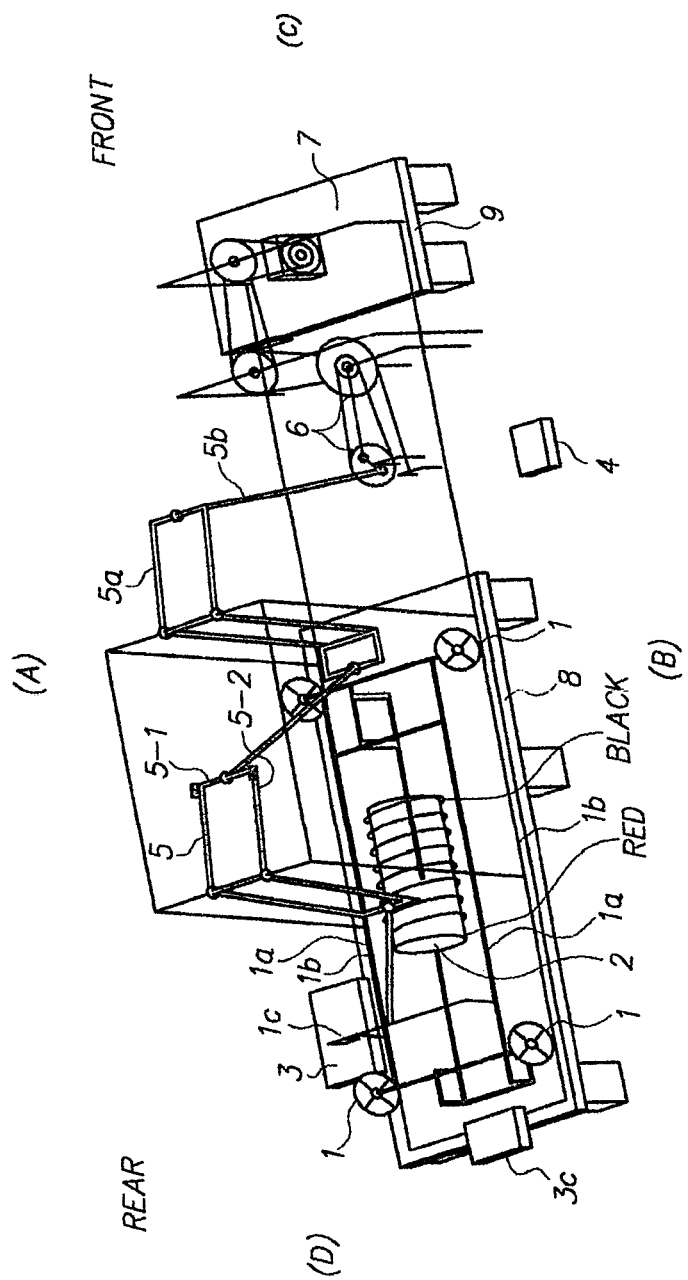
FIG. 1 is a view of the preferred embodiment of the invention (EPM).

FIG. 1 shows an overall view of the preferred embodiment of the claimed invention, along with the numbers for some of the parts to the invention. The reciprocating frame is comprised of metal and brass plumbing pipes, connectors and steel rods. FIG. 1 shows the motor frame section with four metal gate wheels (1), each attached to a corner. Numbers 1a and 1b indicate the sides of a moving platform made of pipe. The electromagnet section (2) comprises an open aluminum tube with enameled magnet copper wire wrapped around it with and having a black end lead and a red end lead. The D.C. Variable Power Supply (4) is also illustrated in FIG. 1, along with 1st LEVER SECTION (5) and 2nd LEVER SECTION (Sa). Number (5b) is the steel rod connection to the 2nd LEVER SECTION and to bicycle paddle gear (6). A modified electric generator (7). The majority of the invention is shown positioned on top of two platforms (8) and (9).

Figure 2:
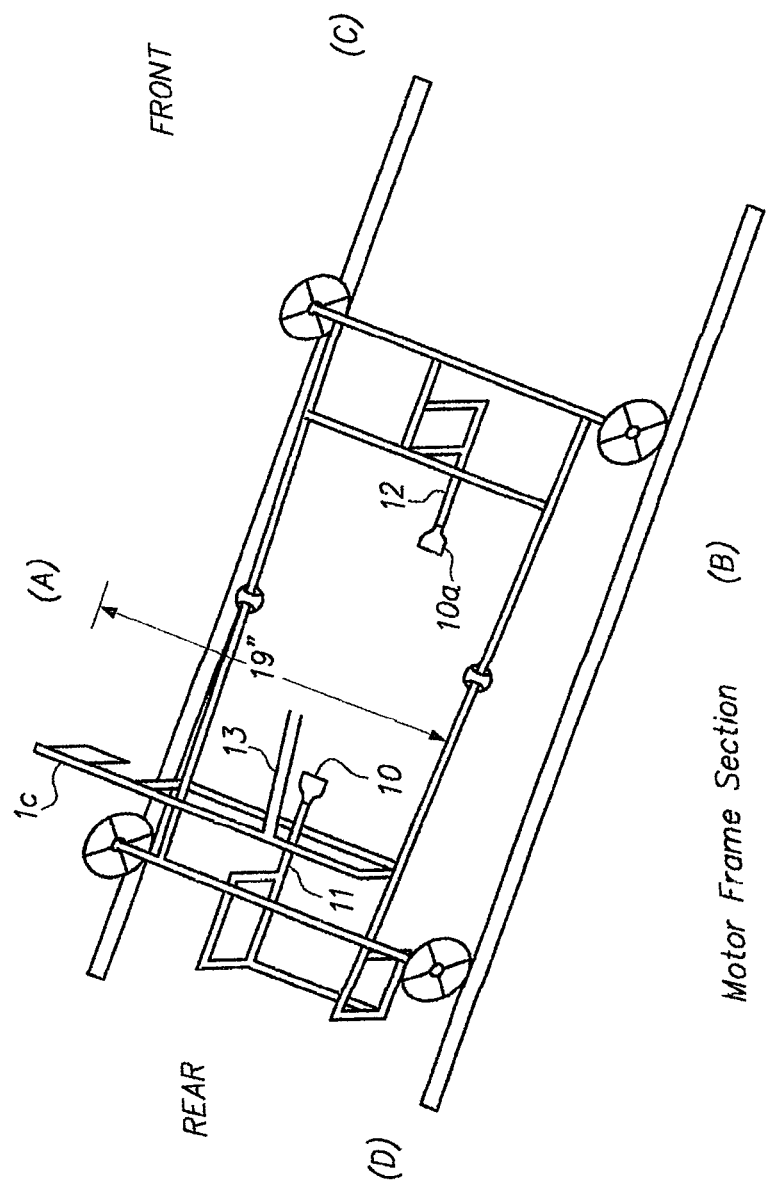
FIG. 2 is a detailed view of the MOTOR FRAME SECTION with a view and positions of some of its parts.

FIG. 2 shows the MOTOR FRAME SECTION with some of its parts

Figure 2A:
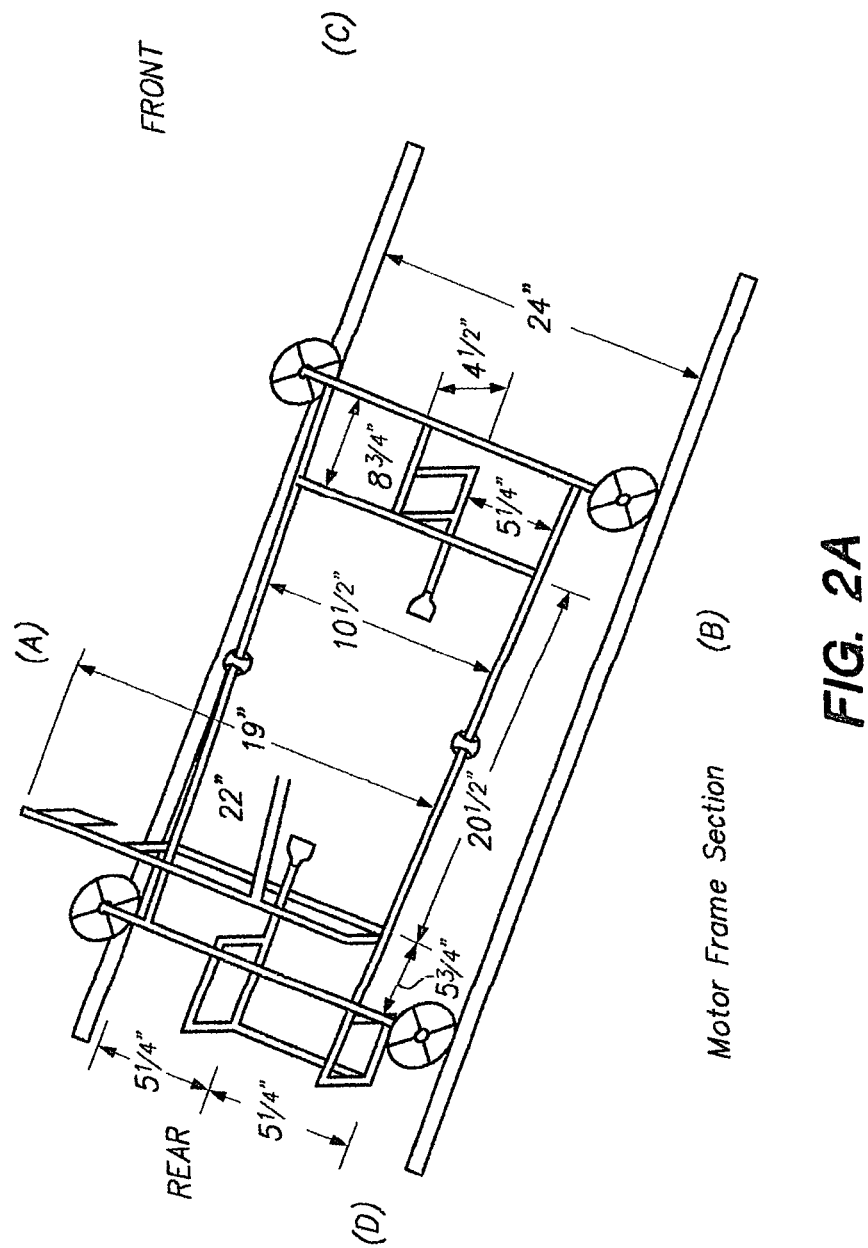
FIG. 2A is a view of the MOTOR FRAME SECTION with some of the part measurements.

FIG. 2A shows some of the measurements of the motor frame section and some of its parts.

Figure 3:
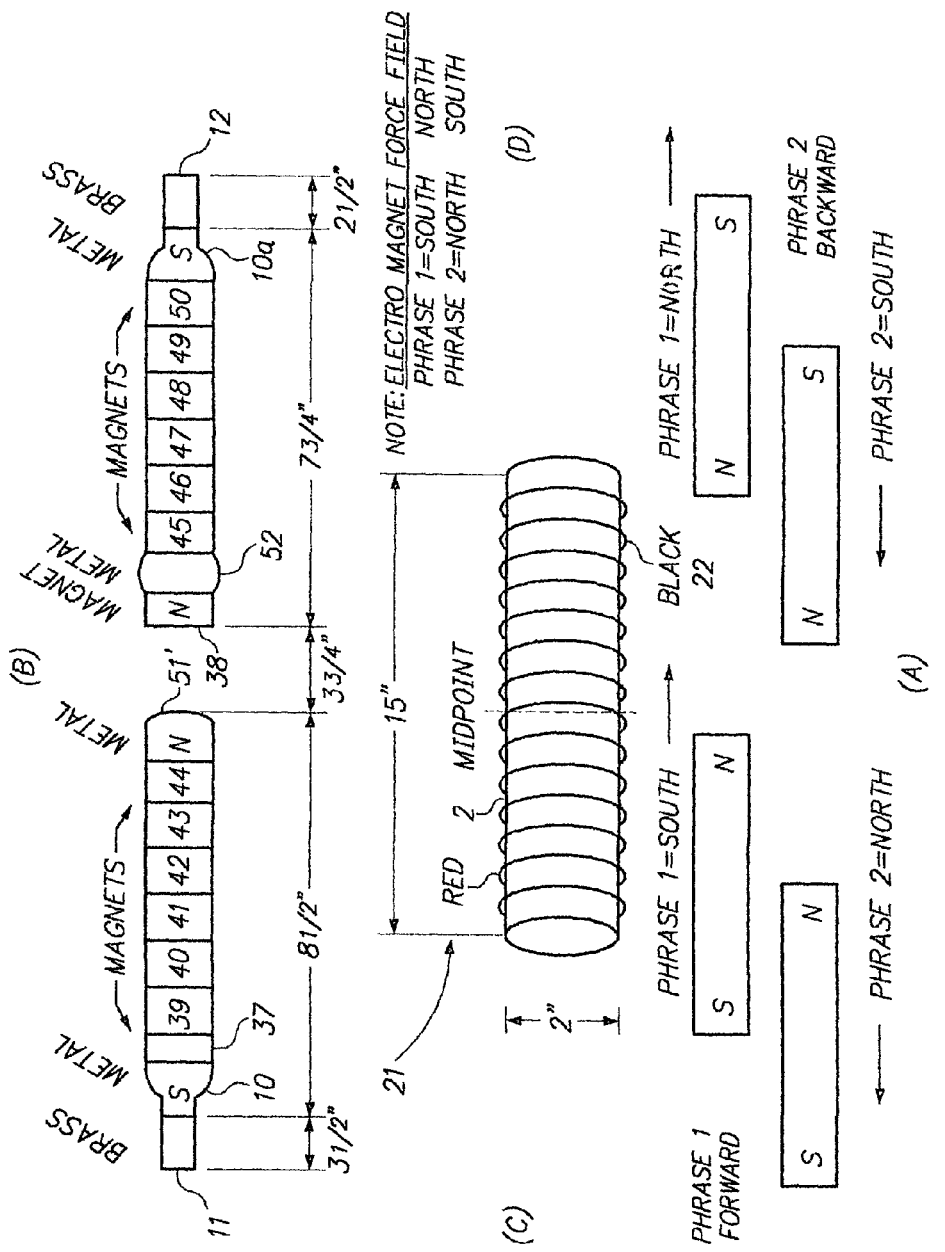
FIG. 3 is a view of the magnet connections, the polarity positions of the magnets & the ELECTROMAGNETIC ALUMINUM TUBE SECTION.

FIG. 3 shows Nickel Plated, Grade N42 Neodymium Magnets. The ELECTROMAGNETIC ALUMINUM TUBE (2). Wrapped around the aluminum tube is an enameled magnet copper wire that has a red lead (21) and a black lead (22).

Figure 4:
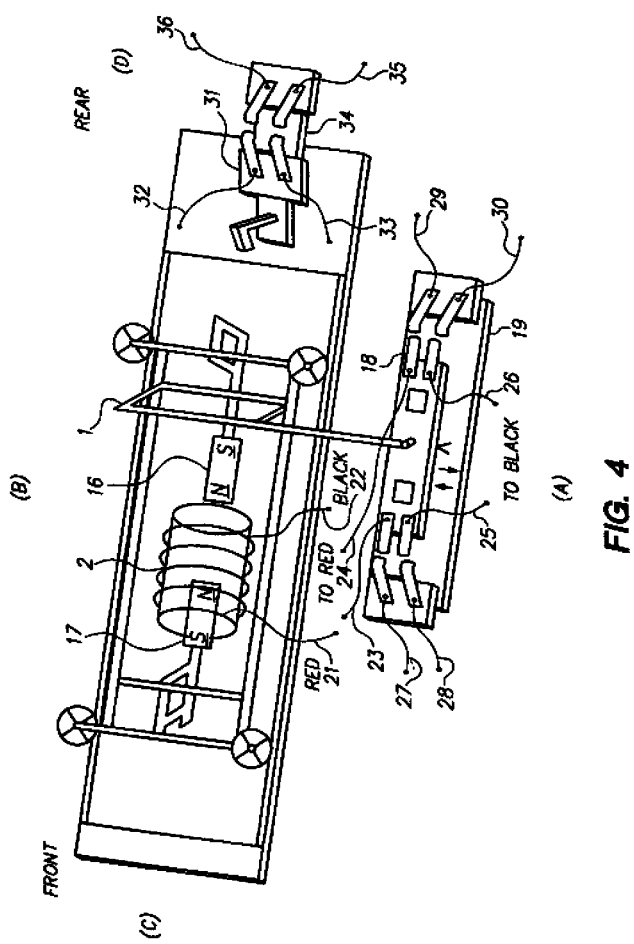
FIG. 4 shows the secured position of the ELECTROMAGNETIC ALUMINUM TUBE inside the MOTOR PLATFORM SECTION frame.

FIG. 4 shows the MOTOR PLATFORM SECTION frame (1), the ELECTROMAGNETIC ALUMINUM TUBE (2) with its RED lead and BLACK lead, the TOP SWITCH SECTION (18), the BOTTOM SWITCH SECTION (19)

Figure 5:
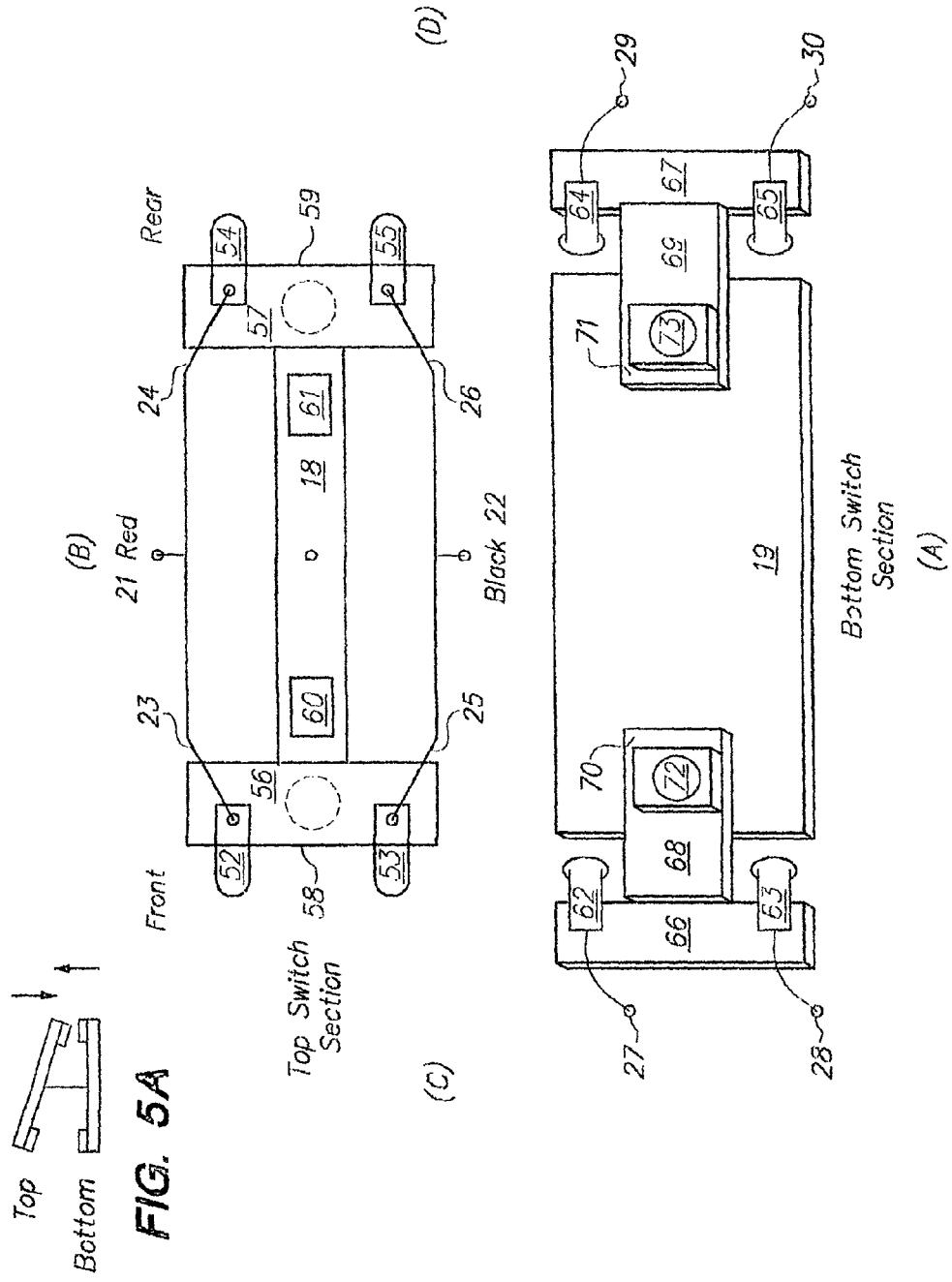
FIG. 5 show views of the TOP & BOTTOM SWITCH SECTIONS.

FIG. 5 shows the TOP SWITCH SECTION (18)

FIG. 5A shows the up and down movement positions of the TOP & BOTTOM SWITCH SECTIONS.

FIG. 6 shows the TOP ELECTRICAL SWITCH SECTION

FIG. 6A shows the up and down movement positions of the TOP & BOTTOM ELECTRICAL SWITCH SECTIONS.

FIG. 7 shows the ELECTRICAL SWITCH SECTION.

Figure 7A:
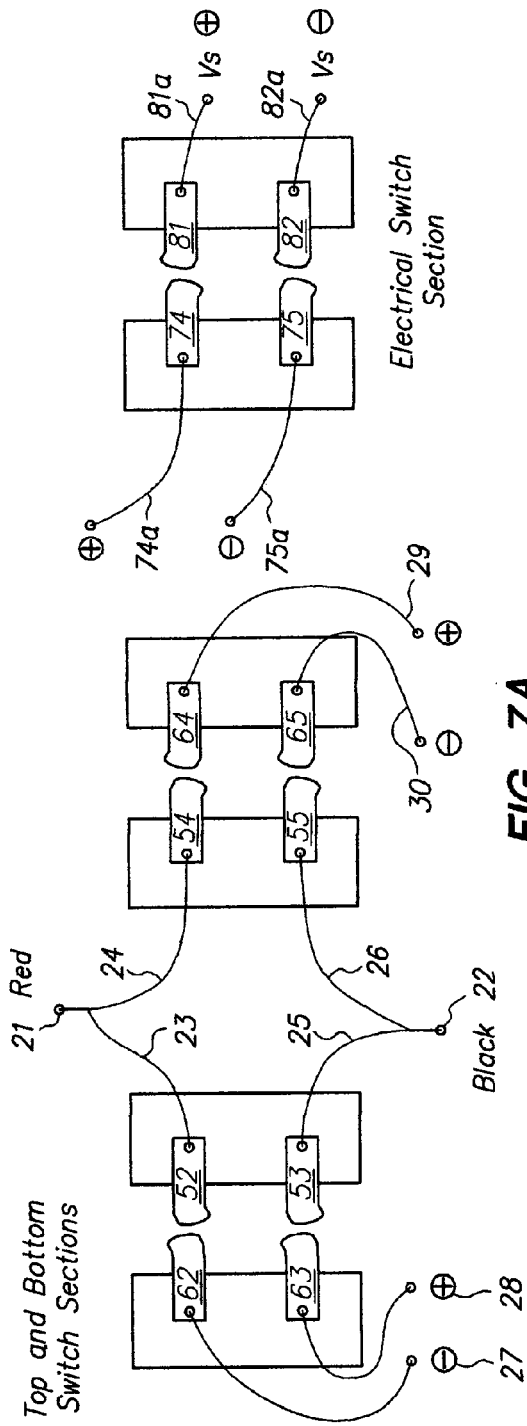
FIG. 7A-7C show drawings of the electrical connections and the voltage source.

FIG. 7A shows the TOP SWITCH SECTION.

Figure 7B:
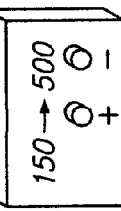

FIG. 7B is a D. C. Variable Voltage Supply of 150-500 volts.

Figure 7C:
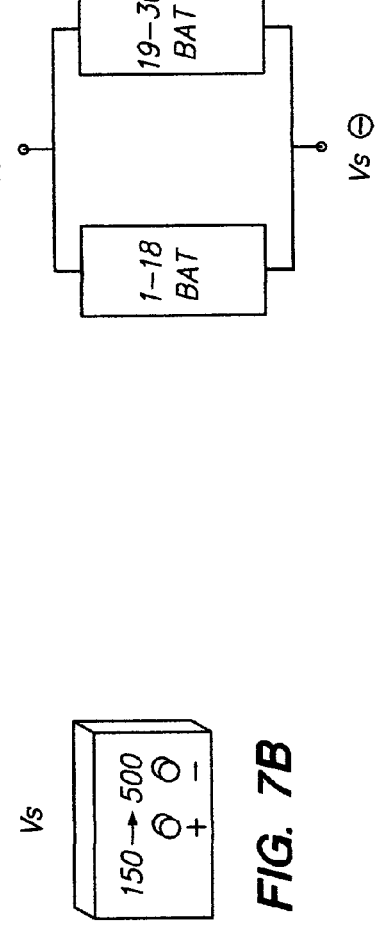

FIG. 7C is two separate groups of eighteen 12-volts car batteries connected in a series circuit, and the groups are connected in to a parallel circuit.

FIG. 8 shows a drawing of a bicycle wheel and bike stand.

FIG. 8A shows a modified ten speed bicycle transmission with eight 2.5 lbs. bar weights (93b) secured around the wheel (93a). Attached to the bicycle wheel is flywheel (94) and a chain (94a) that connects to gears (95) and (96). Chain (96a) connects to gear (97) which turns with gear (98) attached to flywheel (100). Cassette gear (96) has six different speed positions and cassette gear (98) has five different speed position.

Operation of the Electromagnetic Platform Motor

When a D.C. Variable Power Supply provides electrical current to the coil wound around the aluminum tube, the induced magnetic field will attract a permanent magnet. This attraction will linearly displace the magnet and the moving platform to which the magnet is attached. The linear movement of the platform will move the plurality of levers, each lever section changing the direction and torque of the portion of the mechanical power being transmitted. The remaining mechanical power is then provided to the input of the bicycle paddle gear which transforms linear reciprocating motion into rotational motion. The additional gears provide a speed-increase mechanism that allows the operation of a low torque electrical generator.

Description of an Additional Preferred Embodiment

Figure 9:
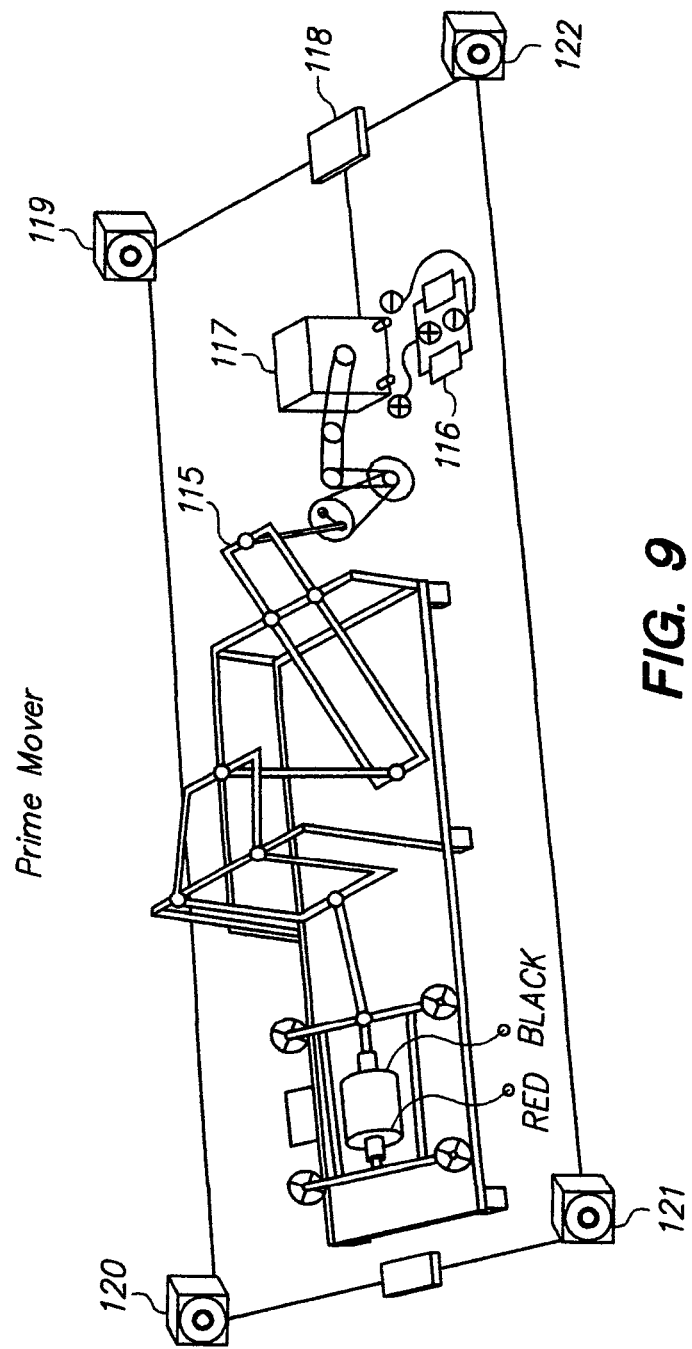
FIG. 9 is a view of the preferred embodiment of the invention including the batteries.

FIG. 9 shows a drawing of the additional preferred embodiment of the MOTOR PLATFORM SECTION. All of the parts are described in the above Figures. In addition, two groups (116) of eighteen 12-volts car batteries each are connected in parallel to generator (117).

Figure 10:
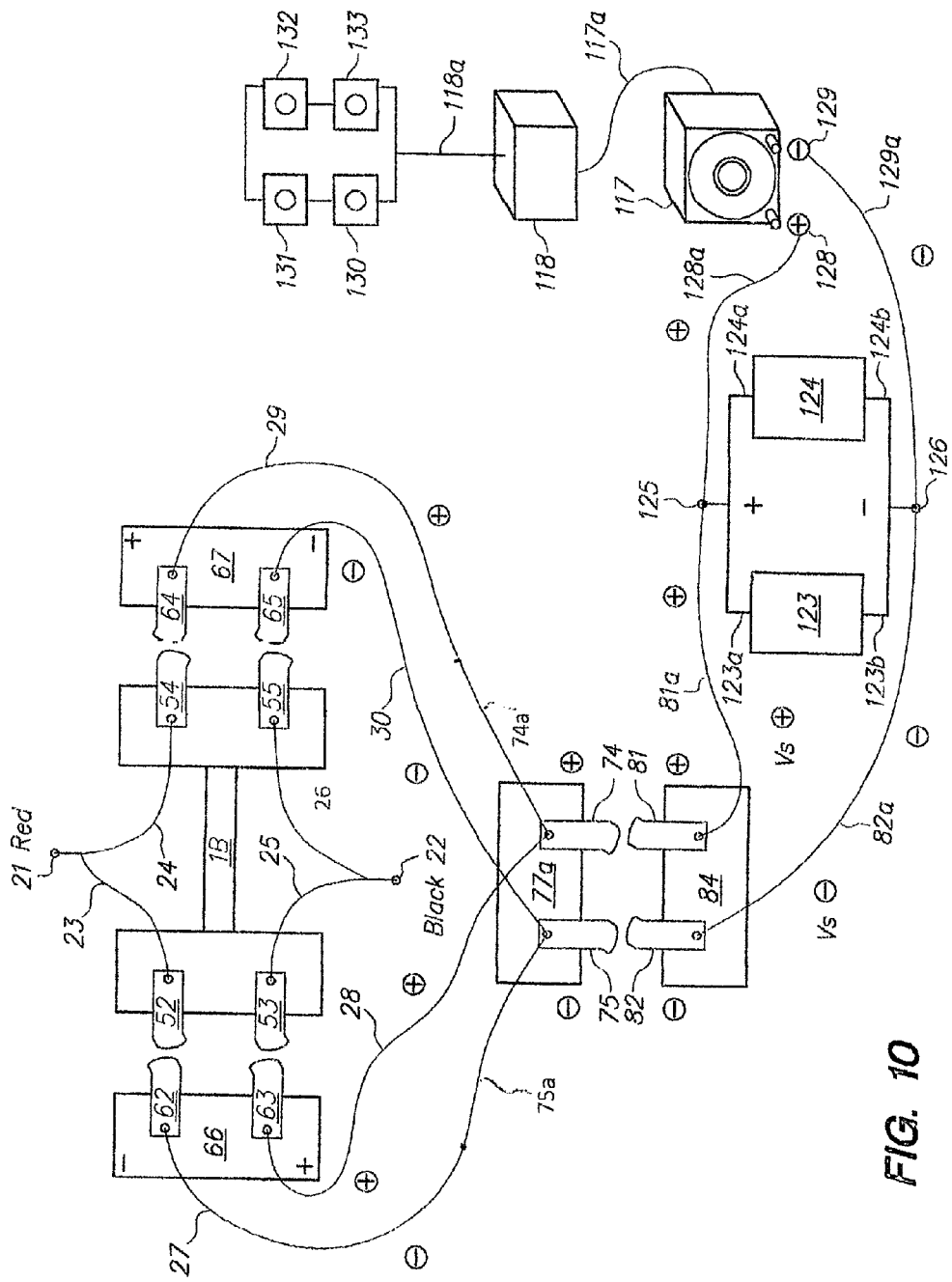
FIG. 10 shows drawings of the electrical switch wiring connections to the battery pack, electrical generator, and controller.

FIG. 10 shows the wiring between the 12 VOLT BATTERIES PACKS, the ELECTRIC GENERATOR, and the wiring.

I claim:

1. An electromagnetic actuated machine, comprising:
   a linear reciprocating motor comprising:
      a metal tube;
      a stationary coil wound around said metal tube and having end leads; and
      at least two permanent magnets configured to reciprocate within the metal tube;
   a linearly moving platform having a plurality of wheels and a supporting member for supporting the at least one permanent magnet;
   a track system for supporting said moving platform;
   a lever system having a plurality of lever stages hingedly connected to each other, said lever system having an input lever and an output lever, said input lever being hingedly connected to said moving platform;
   a ratcheting system for transforming linear mechanical power to rotational mechanical power, said ratcheting system having a reciprocating input and a rotational output, said reciprocating input being hingedly connected to the output lever of the lever system;
   a transmission gear system having a plurality of gears, an input gear, and an output gear, said input gear being mechanically connected to the rotational output of the ratcheting system; and
   an electrical generator mechanically connected to the output gear of the transmission gear system for transforming the rotational mechanical power to electrical energy.

2. The electromagnetic actuated machine according to claim 1, further comprising:
   a DC power supply; and
   an electrical switch section having a plurality of fixed terminals and a plurality of movable terminals;
   wherein said electrical switch section connects the DC power supply to the leads of the stationary coil for generating a current flow; and
   wherein said electrical system is configured to reverse the polarity of the electrical connection between the DC power supply and the stationary coil, thereby reversing the direction of the current flow to said stationary coil for reversing the polarity of the magnetic field generated within the metal tube and causing the moving platform to move in the opposite direction.

3. The electromagnetic actuated machine according to claim 2, wherein said metal tube is made of aluminum.

4. The electromagnetic actuated machine according to claim 2, wherein said stationary coil is an enameled copper coil.

5. The electromagnetic actuated machine according to claim 2, wherein said at least two permanent magnets are nickel plated, grade N42 Neodymium magnets.

6. The electromagnetic actuated machine according to claim 2, wherein said input lever further comprises a plurality of weighted objects.

7. The electromagnetic actuated machine according to claim 2, wherein said ratcheting system further comprises a plurality of weighted objects evenly spaced around the rotational output.

8. The electromagnetic actuated machine according to claim 2, wherein said DC power supply is a variable DC power supply.

9. The electromagnetic actuated machine according to claim 2, wherein said DC power supply is a plurality of DC battery packs.

* * * * *